United States Patent
Kataeva et al.

(10) Patent No.: US 10,074,050 B2
(45) Date of Patent: Sep. 11, 2018

(54) MEMRISTIVE NEUROMORPHIC CIRCUIT AND METHOD FOR TRAINING THE MEMRISTIVE NEUROMORPHIC CIRCUIT

(71) Applicants: DENSO CORPORATION, Kariya, Aichi-pref. (JP); The Regents of the University of California, Oakland, CA (US)

(72) Inventors: Irina Kataeva, Nagoya (JP); Dmitri B. Strukov, Goleta, CA (US); Farnood Merrikh-Bayat, Goleta, CA (US)

(73) Assignees: DENSO CORPORATION, Kariya (JP); The Regents of the University of California, Oakland, CA (US)

( * ) Notice: Subject to any disclaimer, the term of this patent is extended or adjusted under 35 U.S.C. 154(b) by 509 days.

(21) Appl. No.: 14/797,266

(22) Filed: Jul. 13, 2015

(65) Prior Publication Data

US 2017/0017877 A1    Jan. 19, 2017

(51) Int. Cl.
   *G06N 3/08* (2006.01)
   *G06N 3/063* (2006.01)

(52) U.S. Cl.
   CPC .............. *G06N 3/0635* (2013.01); *G06N 3/08* (2013.01)

(58) Field of Classification Search
   CPC .............................. G06N 3/08; G06N 3/0635
   See application file for complete search history.

(56) References Cited

U.S. PATENT DOCUMENTS

| | | |
|---|---|---|
| 2010/0223220 A1 | 9/2010 | Modha et al. |
| 2010/0299296 A1 | 11/2010 | Modha et al. |
| 2010/0299297 A1 | 11/2010 | Breitwisch et al. |
| 2011/0153533 A1 | 6/2011 | Jackson et al. |
| 2012/0011088 A1 | 1/2012 | Aparin et al. |
| 2012/0011090 A1 | 1/2012 | Tang et al. |
| 2012/0011091 A1 | 1/2012 | Aparin et al. |
| 2012/0173471 A1 | 7/2012 | Ananthanarayanan et al. |
| 2012/0265719 A1 | 10/2012 | Modha et al. |
| 2013/0311413 A1 | 11/2013 | Rose et al. |

(Continued)

OTHER PUBLICATIONS

Krizhevsky et al. "ImageNet Classification with Deep Convolutional Neural Networks." 2012.

(Continued)

*Primary Examiner* — Douglas King
(74) *Attorney, Agent, or Firm* — Posz Law Group, PLC

(57) ABSTRACT

A neural network is implemented as a memristive neuromorphic circuit that includes a neuron circuit and a memristive device connected to the neuron circuit. A conductance balanced voltage pair is provided for the memristive device, where the conductance balanced voltage pair includes a set voltage for increasing the conductance of the memristive device and a reset voltage for decreasing the conductance of the memristive device. Either the set voltage and reset voltage, when applied to the memristive device, effects a substantially same magnitude conductance change in the memristive device over a predetermined range of conductance of the memristive device. The provided voltage pair is stored as a conductance balanced map. A training voltage based on the conductance balanced map is applied to the memristive device to train the neural network.

20 Claims, 8 Drawing Sheets

(56) References Cited

U.S. PATENT DOCUMENTS

| | | | | |
|---|---|---|---|---|
| 2015/0120626 | A1* | 4/2015 | Gupta | G06N 3/0454 706/20 |
| 2015/0170025 | A1* | 6/2015 | Wu | G06N 3/0445 706/25 |
| 2016/0342904 | A1* | 11/2016 | Merkel | G06N 3/0635 |

OTHER PUBLICATIONS

Ciresan et al. "Multi-column Deep Neural Networks for Image Classification." 2012.

Alibart et al. "High-Precision Tuning of State for Memristive Devices by Adaptable Variation-Tolerant Algorithm", Nanotechnology, vol. 23, p. 075201, 2012. Discussed on p. 2 of the specification.

Alibart et al. "Pattern classification by memristive crossbar circuits using ex situ and in situ training", Nature Comm., vol. 4, 2013. Discussed on p. 2 of the specification.

Alibart et al. "Pattern classification by memristive crossbar circuits using ex situ and in situ training", Nature Comm., vol. 4, 2013, Supplementary Methods.

Merrikh-Bayat et al. "Phenomenological Modeling of Memristive Devices", accepted to Applied Physics A, 2014. Discussed on p. 2 of the specification.

Likharev. "CrossNets: Neuromorphic Hybrid CMOS/Nanoelectronic Networks", Science of Advanced Materials, vol. 3, pp. 322-331, Jun. 2011. Discussed on p. 2 of the specification.

Glorot et al. "Understanding the difficulty of training deep feedforward neural networks." Proceedings of the 13th International Conference on Artificial Intelligence and Statistics (AISTATS) 2010, Sardinia, Italy, vol. 9 of JMLR: W&CP 9.

LeCun et al. "Efficient BackProp", Neural Networks: Tricks of the Trade (G. Orr and M. K., eds.), Springer, 1998. Discussed on p. 2 of the specification.

U.S. Appl. No. 14/797,284, filed Jul. 13, 2015, Kataeva et al.

* cited by examiner

MEMRISTIVE NEUROMORPHIC CIRCUIT AND METHOD FOR TRAINING THE MEMRISTIVE NEUROMORPHIC CIRCUIT

TECHNICAL FIELD

The present disclosure relates to a memristive neuromorphic circuit implementation of a neural network, and relates to a method for training the memristive neuromorphic circuit.

BACKGROUND

Artificial neural networks have long been used in the field of artificial intelligence as models of biological neural processing. In the past, neural networks have been implemented in software coupled with traditional Von Neumann architecture computing hardware, such as central processing units (CPUs) or graphic processing units (GPUs). Such implementations may require vast amounts of storage space and power.

Accordingly, there has been pressure over the years to move toward using more efficient, specialized hardware technologies. More recently, hybrid complementary metal-oxide semiconductor (CMOS) circuits with integrated memristive devices, also referred to as "memristors", have emerged as one alternative [1]. Memristive devices are well-suited for implementing synaptic weights in neural networks due to their resistive switching characteristics being able to model the synaptic weights in analog form. However, neural networks with integrated memristive devices introduce new challenges in training the neural networks in view of non-linear kinetics present in typical memristive devices [2].

One approach has been to implement ex-situ training where a simulated neural network is trained in software, and the weights are then imported into the CMOS-memristive hardware [3]. However, there is a concern this approach may not adequately account for hardware variability since online training is not performed. As a result, there is a concern that the hardware neural network may underperform with respect to the software simulation.

Conversely, one approach for implementing in-situ training of CMOS-memristive hardware includes performing closed-loop, tuning controls to account for the non-linear kinetics of memristive devices [3, 4]. In this case, there is a concern that this in-situ training approach may not be viable for more complex many-layer neural networks or complex training algorithms (e.g., backpropagation [5]). This is because closed-loop, tuning control processes may be time-consuming and the feedback circuitry is complex. As a result, there is a concern that this approach may not scale at a practical rate and thus may not provide a robust solution for more demanding applications (e.g., automotive or aerospace).

INCORPORATED BY REFERENCE

[1] K. K. Likharev, "*CrossNets: Neuromorphic hybrid CMOS/nanoelectronic networks*", Sci. Adv. Mater., vol. 3, pp. 322-331, June 2011.
[2] F. Merrikh-Bayat et al. "*A phenomenological model of memristive behavior in Pt/TiO$_2$-x/Pt devices*", accepted to Applied Physics A, 2014.
[3] F. Alibart et al., "*Pattern classification by memristive crossbar circuits using ex-situ and in-situ training*", Nature Comm., vol. 4, art. 2071, 2013.
[4] F. Alibart et. al., "*High precision tuning of state for memristive devices by adaptable variation-tolerant algorithm*", Nanotechnology, vol. 23, p. 075201, 2012.
[5] Y. LeCun et. al., "*Efficient backprop*," in Neural Networks: Tricks of the trade (G. Orr and M. K., eds.), Springer, 1998.

SUMMARY

In a first aspect of the present disclosure, there is provided a method for training a memristive neuromorphic circuit that includes a neuron circuit and a memristive device connected to the neuron circuit. The method includes providing a conductance balanced voltage pair that includes a set voltage and a reset voltage, where either the set voltage and reset voltage, when applied to the memristive device, effects a substantially same magnitude conductance change in the memristive device over a predetermined range of conductance of the memristive device. Further, the method includes storing the provided voltage pair as a conductance balanced map. Even further, the method includes applying, based on the conductance balanced map, a training voltage to the memristive device.

In a second aspect of the present disclosure, there is provided a memristive neuromorphic circuit. The memristive neuromorphic circuit includes a neuron circuit, a memristive device that is connected to the neuron circuit, and a controller including a CPU and a memory. The memory is configured to store a conductance balanced map, and the controller is configured to apply, based on the conductance balanced map, a training voltage to the memristive device. Here, the conductance balanced map includes a conductance balanced voltage pair of a set voltage and a reset voltage, where either the set voltage and reset voltage, when applied to the memristive device, effects a substantially same magnitude conductance change in the memristive device over a predetermined range of conductance of the memristive device.

In a third aspect of the present disclosure, there is provided a method for training a memristive neuromorphic circuit that includes a neuron circuit and a memristive device connected to the neuron circuit. The method includes providing a first conductance balanced voltage pair that includes a first set voltage and a first reset voltage, where the first set voltage, when applied to the memristive device, effects a first magnitude conductance change in the memristive device over a predetermined range of conductance of the memristive device, and the first reset voltage, when applied to the memristive device, effects a second magnitude conductance change in the memristive device over the predetermined range of conductance of the memristive device. The method includes providing a second conductance balanced voltage pair that includes a second set voltage and a second reset voltage, where the second set voltage, when applied to the memristive device, effects a third magnitude conductance change in the memristive device over the predetermined range of conductance of the memristive device, and the second reset voltage, when applied to the memristive device, effects a fourth magnitude conductance change in the memristive device over the predetermined range of conductance of the memristive device. The method includes storing the provided first and second voltage pairs as a conductance balanced map. And, the method includes applying, based on the conductance balanced map, a training voltage to the memristive device. In this method, a ratio between the first magnitude and the second magnitude is substantially equal to a ratio between the third magnitude and the fourth magnitude.

Still other objects, advantages, and features of the present disclosure will become apparent after considering the specification and drawings.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

A first embodiment of the present description will be explained with reference to FIGS. 1 to 8.

Figure 1:
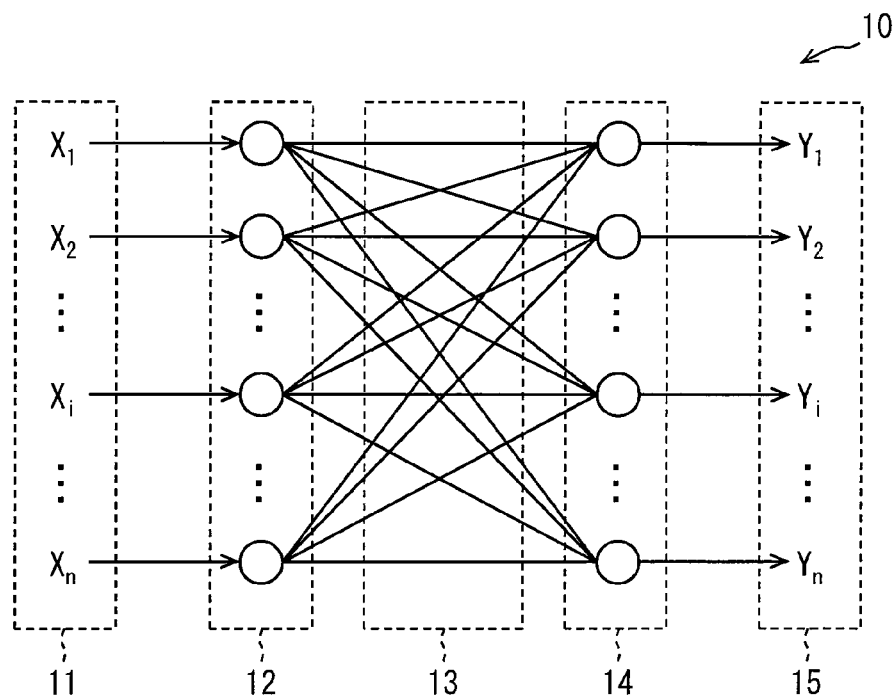
FIG. 1 is a schematic view showing a neural network in accordance with the present disclosure.

FIG. 1 is a schematic view showing an artificial neural network 10. The neural network 10 includes inputs 11, input neurons 12, weights 13, output neurons 14, and outputs 15. Here, FIG. 1 shows a representative pair of layers of the neural network 10. In other words, while FIG. 1 shows one input layer and one output layer, the input neurons 12 may be receiving the inputs 11 as output from a previous layer of neurons (not illustrated). Similarly, the output neurons 14 may be outputting the outputs 15 to be input to a subsequent layer of neurons (not illustrated). Accordingly, the terms "input" and "output" as used herein are relative terms, meaning the input neurons 12 may be a first layer or a hidden layer, and similarly the output neurons may be a last layer or a hidden layer.

The inputs 11 include individual inputs $x_1$, $x_2$, and so on, up to $x_n$, and are input to respective ones of the input neurons 12. The input neurons 12 are in turn connected to the output neurons 14 via weights 13. which are sometimes referred to as synapses. Then, the outputs 15 are output from the output neurons 14. Specifically, each of the output neurons 14 is configured to output respective individual outputs $y_1$, $y_2$, and so on, up to $y_n$. The input neurons 12 and the output neurons 14 are sometimes referred to as nodes, and the weights 13 are sometimes referred to as synapses.

In FIG. 1, the input neurons 12 and the output neurons 14 are shown in a non-recurrent, completely connected configuration. However, this typology is exemplary, and various other typologies are contemplated. "Exemplary" as used herein means "serving as an example", and is not necessarily to be construed as a preferred or advantageous aspect.

Figure 2:
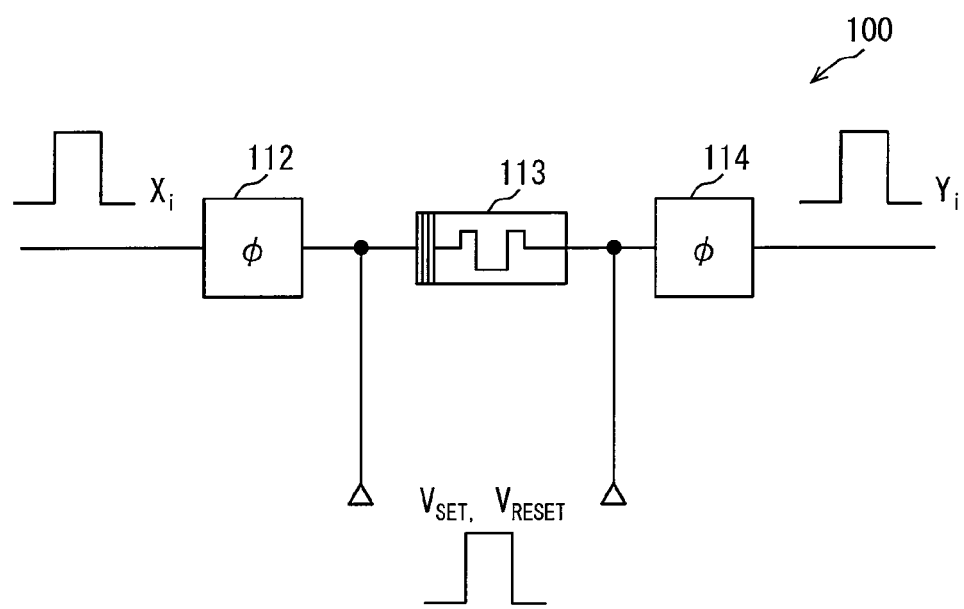
FIG. 2 is a schematic view showing a memristive neuromorphic circuit in accordance with a first embodiment of the present disclosure.

In the present embodiment, the neural network 10 is physically implemented as a memristive neuromorphic circuit 100, which is a hybrid CMOS-memristive type circuit. FIG. 2 is a schematic view showing a portion of the memristive neuromorphic circuit 100 in accordance with the present embodiment. The memristive neuromorphic circuit 100 includes an input neuron 112 that is connected through a memristive device 113 to an output neuron 114. The input $x_i$ and the output $y_i$ are voltage signals. Here, the input neuron 112 and the output neuron 114 are CMOS devices. The input neuron 112 is physically implemented as a neuron circuit. Specifically, the input neuron 112 is preferably an integrated circuit (IC) having an activation function φ (or input-output function) that transforms the input $x_i$. The activation function φ may be linear, logistic sigmoid, hyperbolic tangent, rectified linear, or any one of a variety of activation functions. The activation function φ may be the same for the input neuron 112 and the output neuron 114, or may be different.

The input neuron 112 outputs the transformed voltage signal to the memristive device 113. In addition, the input neuron 112 may include a summing function, in advance of the activation function φ, that sums all signals input thereto. Alternatively, the summing function may be implemented as a separate circuit (e.g., a summing op-amp circuit). In this present embodiment, the output neuron 114 is also implemented as a neuron circuit, and has the same configuration as the input neuron 112. However, this is not limiting, and the configuration of the output neuron 114 may differ, e.g., by including or not including a summing function. Sensing circuitry (not illustrated) is preferably provided to read the inputs and outputs of the input neuron 112 and the output neuron 114.

Still referring to FIG. 2, the memristive device 113 in the present embodiment is a bipolar memristive device having a conductance G that is adjustable, reversibly and continuously, between a minimum value $G_{MIN}$ and a maximum value $G_{MAX}$. In the present embodiment, the memristive device 113 is preferably a Pt/TiO$_{2-x}$/Pt metal oxide device, but may be alternatively implemented as a different metal oxide device, a phase change memory, a magnetic tunnel junction memory cell, a solid state resistive switching device, or the like.

The conductance G of the memristive device 113 acts as a weight in the neural network 10. Specifically, when the neural network 10 classifies a pattern, an input voltage signal from the input neuron 112 is linearly scaled by the conductance G of the memristive device 113, in accordance with Ohm's law, and sent to the output neuron 114. Similarly, if the neural network 10 is trained by, e.g., backpropagation, when an error is backpropagated through the neural network 10, an error signal from the output neuron 114 is linearly scaled by the conductance G of the memristive device 113 and sent to the input neuron 112. During training of the neural network 10, the conductance G of the memristive device 113 may be modified in accordance with a training rule. In the present embodiment, the training rule is preferably backpropagation, but may be any training rule as known in the field of artificial neural networks.

Generally, the conductance G of the memristive device 113 is increased (or SET) when a negative training voltage $V_{SET}$ is applied, and is decreased (or RESET) when a positive training voltage $V_{RESET}$ is applied. Hereinafter, for simplicity, $V_{SET}$ and $V_{RESET}$ will be explained with reference to their amplitudes where signage is not explicitly mentioned. In FIG. 2, $V_{SET}$ and $V_{RESET}$ are shown as being applied directly to the memristive device 113. This is done so that the $V_{SET}$ and $V_{RESET}$ voltages signals themselves are not transformed by the activation functions $\phi$ of the input neuron 112 and the output neuron 114. Alternatively, if the input neuron 112 and the output neuron 114 are configured with linear, or mostly linear, activation functions $\phi$, the $V_{SET}$ and $V_{RESET}$ voltage signals may be transmitted through the input neuron 112 and the output neuron 114 instead.

In general, a conductance change $\Delta G$ in the memristive device 113 is dependent on the integral of a training voltage V applied thereto. However, the internal kinetics of the memristive device 113 are highly non-linear, and as a result, the conductance change $\Delta G$ in the memristive device 113 is also dependent on the instantaneous conductance G of the memristive device 113 itself. Specifically, $\Delta G$ may be given as:

$$\Delta G = f(G, V, \Delta t) \quad (1)$$

where G is the instantaneous conductance of the memristive device 113 itself, V is the training voltage signal applied (encompassing both the amplitude and the sign of the training voltage signal), and $\Delta t$ is the duration of the training voltage signal applied. Hereinafter, for simplicity, $\Delta G$ will be explained with reference to its magnitude where signage is not explicitly mentioned.

Figure 3:
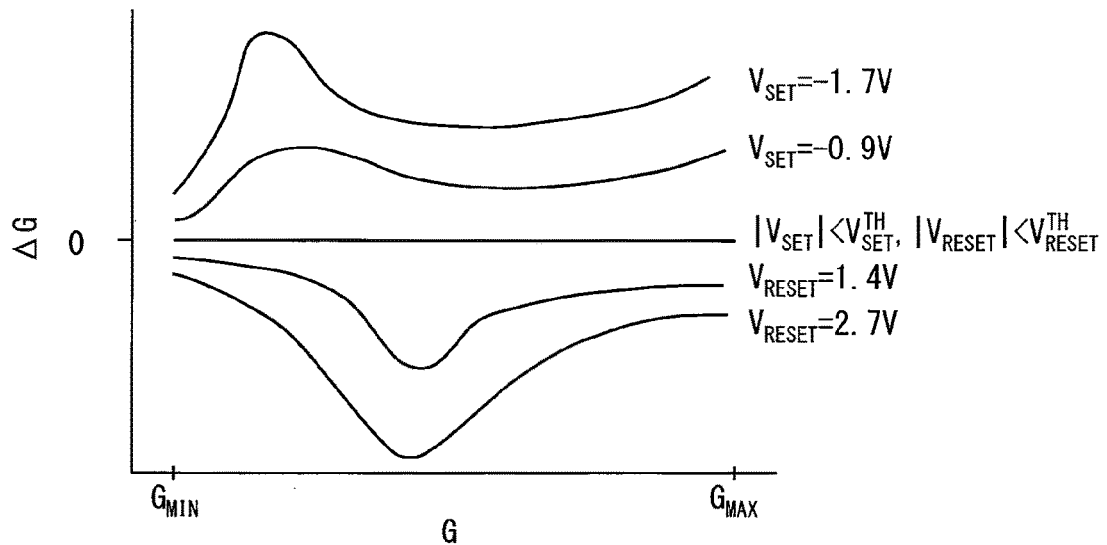
FIG. 3 is a graph showing conductance change curves for a memristive device.

FIG. 3 illustrates exemplary conductance change curves of a number of different training voltage signals when applied to the memristive device 113 over a range of instantaneous conductance G of the memristive device 113. Specifically, FIG. 3 shows the relationship between conductance change $\Delta G$ and instantaneous conductance G when training voltage signals of various amplitudes are applied to the memristive device 113.

In FIG. 3, all training voltage signals are applied for a predetermined duration $\Delta t$ (e.g., 10 μs) to isolate the effects of the amplitude and sign of the applied training voltage signal. It should be noted that the training voltage signals shown in FIG. 3 are arbitrarily selected for exemplary purposes, and therefore should not be construed as limiting. Similarly, the specific shapes of the conductance change curves in FIG. 3, while typical, are nevertheless memristive device-specific and therefore exemplary in nature as well. For example, in a different memristive device but equally applicable to the present embodiment, the conductance change curve of $V_{SET}$ may decrease as the instantaneous conductance G approaches $G_{MAX}$.

As shown in FIG. 3, for any given training voltage signal, the conductance change $\Delta G$ of the memristive device 113 depends on the instantaneous conductance G of the memristive device 113 itself. Further, at any instantaneous conductance G of the memristive device 113 itself, the conductance change $\Delta G$ of the memristive device 113 depends on both the magnitude and the sign of the applied training voltage signal. Moreover, the conductance change curves show that the conductance change $\Delta G$ of the memristive device 113 is not linear with respect to any of these parameters.

FIG. 3 also shows that when $V_{SET}$ is below a threshold voltage $V_{SET}^{TH}$, or when $V_{RESET}$ is below a threshold voltage $V_{RESET}^{TH}$, the conductance change $\Delta G$ of the memristive device 113 is zero for the entire range of G. This particular non-linearity is useful by allowing the conductance G of the memristive device 113 to be, selectively, read (i.e., by applying a voltage signal below the threshold voltages) or written (i.e., by applying a voltage signal above the threshold voltages). Specifically, when reading with a voltage signal below the threshold voltages, the instantaneous conductance G of the memristive device 113 is not disturbed.

More specifically, when reading the conductance G of the memristive device 113, a read voltage $V_{READ}$ with an amplitude equal to or less than a read threshold voltage $V_{READ}^{TH}$ is applied to the memristive device 113. Here, because conductance is a non-directional property and may be measured in either direction using Ohm's law, the directionality of $V_{READ}$ may be configured as either positive or negative. When $V_{READ}$ is configured as a positive signal, the amplitude of $V_{READ}^{TH}$ is set to be equal to or less than that of $V_{RESET}^{TH}$. Conversely, when $V_{READ}$ is configured as a negative signal, the amplitude of $V_{READ}^{TH}$ is set to be equal to or less than that of $V_{SET}^{TH}$. Since the directionality of $V_{READ}$ may be arbitrarily set, $V_{READ}$ as used hereinafter may refer to either a positive or negative read signal.

In practice, $V_{READ}^{TH}$ is generally set to be lower than $V_{SET}^{TH}$ or $V_{RESET}^{TH}$ by a safety margin, so that when reading the conductance G of the memristive device 113, the conductance G of the memristive device 113 is not inadvertently changed. This is because the values of $V_{SET}^{TH}$ and $V_{RESET}^{TH}$ may vary across multiple memristive devices, and may also vary over different durations $\Delta t$ of the applied voltage signal. In one exemplary configuration, a particular Pt/TiO$_{2-x}$/Pt metal oxide device is found to have $V_{SET}^{TH}$ and $V_{RESET}^{TH}$ values of −0.8V and 1.35V, respectively. To ensure a safety margin when reading the conductance G of this particular Pt/TiO$_{2-x}$/Pt metal oxide device, the magnitude of the read threshold voltage $V_{READ}^{TH}$ is set to be 0.5V, i.e., substantially lower than the nominal values for $V_{SET}^{TH}$ and $V_{RESET}^{TH}$. Here, a variety of safety margins may be used, and other configurations using larger or smaller safety margins, or using no safety margin at all, are also contemplated.

Returning to FIG. 3, as explained above, all of the conductance change curves are obtained from voltage signals applied for a same predetermined duration $\Delta t$. Here, changing the duration $\Delta t$ of the voltage signals may be approximated as linearly scaling a resulting conductance change $\Delta G$. In other words, the amplitudes of the conductance change curves depicted in FIG. 3 would be scaled by a linear factor over the entire range of G. This is because, in the present embodiment, the magnitude of the conductance change $\Delta G$ is sufficiently small when compared to the entire range of G that the rate of change in conductance $\Delta G/\Delta t$ is approximately constant over the duration $\Delta t$ of an applied training voltage.

Figure 4:
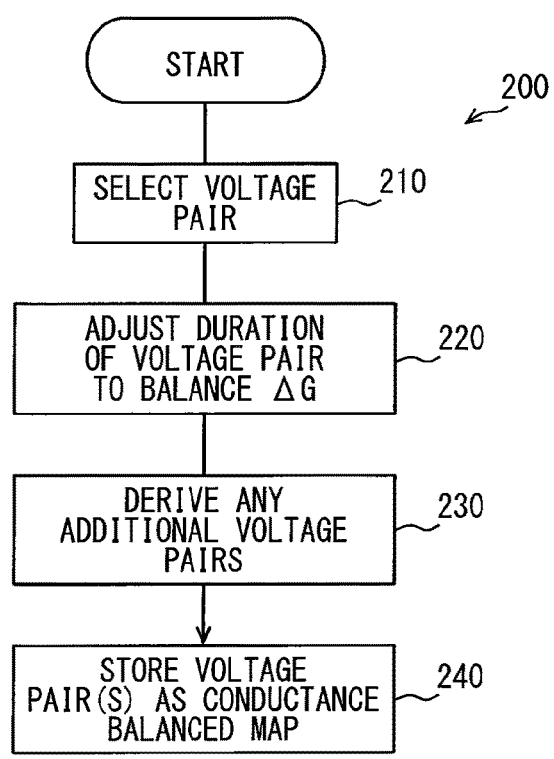
FIG. 4 is a flowchart showing a training process in accordance with the first embodiment.

FIG. 4 is a flow chart showing a process 200 of providing a conductance balanced map in accordance with the present embodiment, using the above discussed properties of the memristive device 113. The process 200 is not to be construed as limited to a particular actor. For example, in one embodiment to be described later, one or more steps, or substeps, of the process 200 may be carried out by a controller, automatically or otherwise. However, a variety of actors, and combinations thereof, are contemplated.

The process 200 beings at step 210. At step 210, a voltage pair that includes a set voltage $V_{SET}$ and a reset voltage $V_{RESET}$ is selected. Amplitude values of $V_{SET}$ and $V_{RESET}$ may be arbitrarily selected. Alternatively, the amplitude values of $V_{SET}$ and $V_{RESET}$ may be selected from a predetermined range of amplitudes based on physical constraints of the neural network 10. Durations $\Delta t$ of $V_{SET}$ and $V_{RESET}$ may also be arbitrarily selected. Alternatively, $V_{SET}$ and $V_{RESET}$ may be selected with a same predetermined duration $\Delta t$ After selecting a voltage pair, the process 200 proceeds to step 220.

In step 220, the durations $\Delta t$ of the selected voltage pair $V_{SET}$ and $V_{RESET}$ are individually adjusted such that $V_{SET}$ and $V_{RESET}$ are conductance balanced. Specifically, only the duration $\Delta t$ of the selected $V_{SET}$ may be adjusted, or only the duration $\Delta t$ of the selected $V_{RESET}$ may be adjusted, or both may be adjusted. Here, "conductance balanced" refers to effecting a substantially same magnitude conductance change $\Delta G$ in the memristive device 113 over a predetermined range of instantaneous conductance G of the memristive device 113. Thus, steps 210 and 220 collectively provide the conductance balanced pair.

Figure 5:
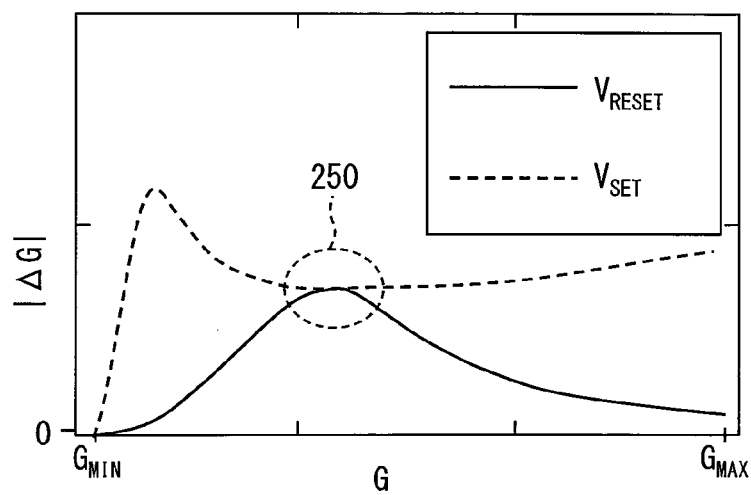
FIG. 5 is a graph showing a conductance balanced voltage pair in accordance with the first embodiment.

FIG. 5 shows the conductance change curves of an exemplary conductance balanced voltage pair of a set voltage $V_{SET}$ and a reset voltage $V_{RESET}$. In this case, the durations $\Delta t$ of $V_{SET}$ and $V_{RESET}$ as set to be 10 μs and 2 μs, respectively. These values are device-specific and exemplary. As shown in FIG. 5, by adjusting the durations $\Delta t$ of $V_{SET}$ and $V_{RESET}$, the conductance change curves of the selected voltage pair $V_{SET}$ and $V_{RESET}$ may be set to be substantially equal over an overlapping range of instantaneous conductance G values of the memristive device 113. This overlapping range is shown as equilibrium region 250 in FIG. 5. In other words, in the equilibrium region 250, the $V_{SET}$ and $V_{RESET}$ voltages of FIG. 5 effect a substantially same magnitude conductance change $\Delta G$ in the memristive device 113. In the present embodiment, the equilibrium region 250 is set to be sufficiently wide such that the weights 13 of the neural network, when implemented as the memristive device 113, are free to settle over a range of conductances G during training of the neural network 10.

In the present embodiment, the property of "conductance balanced" is explained with respect to terms such as "substantially same" and "sufficiently wide". These terms are intentionally used due to the inherently non-linear nature of hybrid CMOS-memristive circuits and the inherently approximating nature of neural networks in general. To clearly explain the conductance balanced property of the exemplary voltage pair in FIG. 5, contrasting reference examples are provided and shown in FIGS. 6A and 6B. Specifically, FIGS. 6A and 6B are reference examples that illustrate conductance unbalanced voltage pairs.

Figure 6A:
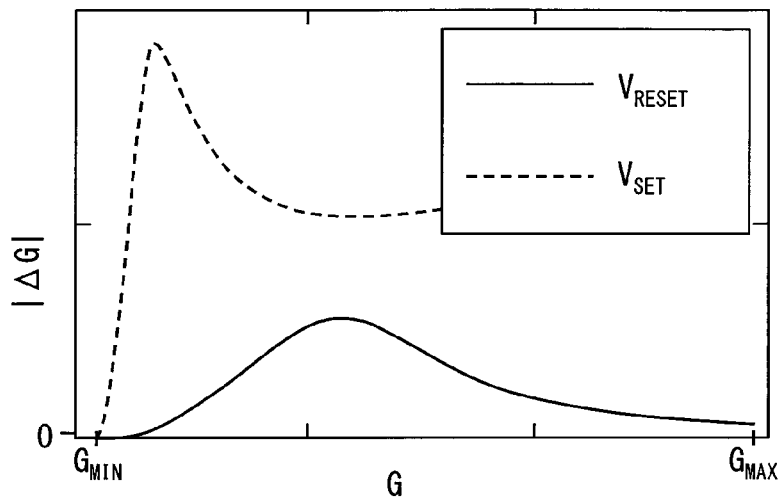
FIGS. 6A and 6B are graphs showing reference examples of conductance unbalanced voltage pairs.

Here, FIG. 6A shows a voltage pair where the conductance change curves of $V_{SET}$ and $V_{RESET}$ are clearly disjointed over the entire range of G. In other words, at every instantaneous conductance G of the memristive device 113, the conductance change $\Delta G_{SET}$ effected by the $V_{SET}$ voltage dominates the conductance change $\Delta G_{RESET}$ effected by the $V_{RESET}$ voltage. In this case, the instantaneous conductance G of the memristive device 113 are strongly biased in favor of SET process, and therefore are likely to collapse toward $G_{MAX}$.

Figure 6B:
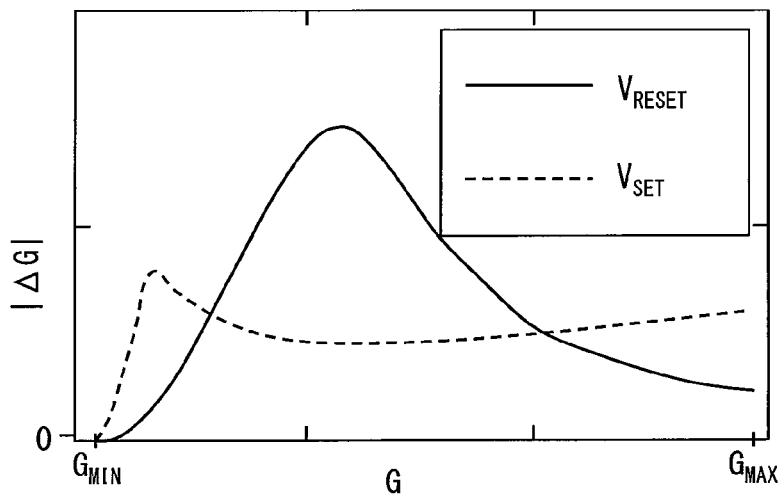

Conversely, FIG. 6B shows a voltage pair where the conductance change curves of $V_{SET}$ and $V_{RESET}$ cross at two distinct intersection points, i.e., $\Delta G_{SET} = \Delta G_{RESET}$ at two points. In this case, the instantaneous conductance G of the memristive device 113 will be strongly biased toward converging at these intersection points even if the desired convergence values were different. In other words, voltage pair of FIG. 5 is conductance balanced, while those of FIGS. 6A and 6B are not. The property of "conductance balanced" will be further explained with respect to FIG. 8 below.

Returning to FIG. 4, after the conductance balanced voltage pair is obtained at step 220, the process 200 proceeds to step 230. In step 230, the conductance balanced voltage pair obtained from step 220 may be used to derive additional conductance balanced voltage pairs of $V_{SET}$ and $V_{RESET}$, which have different amplitudes and effect different conductance changes $\Delta G = \Delta G_{SET} = \Delta G_{RESET}$. Specifically, based on the conductance balanced voltage pair from step 220, a range of conductance balanced $V_{SET}$ and $V_{RESET}$ pairs may be associated with a range of conductance change $\Delta G = \Delta G_{SET} = \Delta G_{RESET}$. These ranges may be obtained as discrete values, or may be obtained as continuous functions. Then, the process 200 proceeds to step 240, where the ranges of $V_{SET}$, $V_{RESET}$, and $\Delta G$ are stored as a conductance balanced map that defines a relationship of:

$$V = f(\Delta G) \quad (2)$$

for both $V_{SET}$ and $V_{RESET}$. In step 240, the conductance balanced voltage pair, and any derived voltage pairs, may be trimmed to be within predetermined ranges $V_{SET}^{MIN}$ to $V_{SET}^{MAX}$ and $V_{RESET}^{MIN}$ to $V_{RESET}^{MAX}$. These ranges may be set based on physical constraints. For example, the minimum values may be set to be equal to or higher than $V_{SET}^{TH}$ and $V_{RESET}^{TH}$ to ensure that all conductance balanced voltage pairs effect conductance changes in the memristive devices 113. The maximum values may be set to be below, e.g., breakdown voltages inherent to the neural network 10.

In Equation (2), $V_{SET}$ and $V_{RESET}$ are defined in terms of $\Delta G$. Compared to Equation (1) above, the terms G and $\Delta t$ are eliminated from Equation (2). Specifically, the $\Delta t$ term is eliminated because in step 220, $\Delta t$ of the selected voltage pair $V_{SET}$ and $V_{RESET}$ are individually adjusted and set to specific values, and therefore known. Further, the term G is eliminated because the mapped voltage pairs are conductance balanced, and thus Equation (2) is assumed to be valid over all values of G. While the exemplary conductance balanced voltage pair in FIG. 5 is shown with conductance change curves that are not balanced over all possible values of G (but rather only over the equilibrium region 250), experimental results, which will be described later, show that as long as the equilibrium region 250 is sufficiently wide, Equation (2) may be approximated as being valid over all values of G.

In the present embodiment, the conductance balanced map may be derived in a variety of ways. In one aspect of the present embodiment, the conductance balanced map may be derived by extrapolation. Specifically, the amplitudes of the conductance balanced voltage pair obtained at step 220 of FIG. 4 may be linearly scaled by predetermined factors while maintaining the duration $\Delta t$ ratio between $V_{SET}$ and $V_{RESET}$. Then, the linearly scaled voltage pairs are associated with respective conductance changes $\Delta G = \Delta G_{SET} = \Delta G_{RESET}$, which are also scaled based on a predetermined factor. By maintaining the duration $\Delta t$ ratio between $V_{SET}$ and $V_{RESET}$ for all extrapolated voltage pairs, and using appropriate scaling factors, the extrapolated voltage pairs are also conductance balanced. In other words, from the conductance balanced voltage pair obtained at step 220, a number of additional conductance balanced voltage pairs are extrapolated and stored in the conductance balanced map. This process of extrapolation uses predetermined scaling factors for $V_{SET}$, $V_{RESET}$, and $\Delta G$, which may be obtained from prior characterization of the memristive device 113.

In another aspect of the present embodiment, the conductance balanced map may be derived by interpolation. Specifically, the selection and balancing steps 210 and 220 of FIG. 4 may be repeated to provide respective conductance balanced voltage pairs at minimum and maximum values for $V_{SET}$ and $V_{RESET}$, each voltage pair having the same duration $\Delta t$ ratio between $V_{SET}$ and $V_{RESET}$. Then, using these minimum and maximum value conductance balanced voltage pairs, intervening voltage values may be directly interpolated while maintaining the duration $\Delta t$ ratio between $V_{SET}$ and $V_{RESET}$. In addition, the conductance changes $\Delta G=\Delta G_{SET}=\Delta G_{RESET}$ of the intervening voltage pairs may also be directly interpolated from the conductance change $\Delta G$ of the minimum and maximum value conductance balanced voltage pairs. This process of interpolation may be performed without using predetermined scaling factors by modeling the relationship between V (i.e., each of $V_{SET}$, $V_{RESET}$) and $\Delta G$ as a function, such as linear, logarithmic, a combination of different functions, and so on. In addition, the accuracy of the interpolation may be improved by repeating steps 210 and 220 of FIG. 4 to provide additional intervening conductance balanced voltage pairs. In this case, the process of interpolation would be divided into multiple, smaller ranges.

In yet another aspect of the present embodiment, the conductance balanced map may be derived by direct storage. Specifically, the selection and balancing steps 210 and 220 of FIG. 4 may be repeated a sufficient number of times over a wide range of voltage values to provide a plurality of conductance balanced voltage pairs. In this case, the plurality of conductance balanced voltage pairs are directly stored as the conductance balanced map. The ranges of $V_{SET}$, $V_{RESET}$, and $\Delta G$ are thus provided as discrete values, i.e., those directly obtained from repeating steps 210 and 220. Since the values of the conductance balanced map are directly stored, this process of direct storage may be performed without using predetermined scaling factors, and without modeling any of $V_{SET}$, $V_{RESET}$, and $\Delta G$ as a function. However, as an alternative, curve fitting may be performed on the discrete values of $V_{SET}$, $V_{RESET}$, and $\Delta G$ to model the relationship between V and $\Delta G$ as a function. When curve fitting is performed, the direct storage derivation process may be considered as being equivalent to the interpolation derivation process described above.

In yet another aspect of the present embodiment, the conductance balanced map may be derived by data masking. That is, instead of deriving additional conductance balanced voltage pairs, the single conductance balanced voltage pair provided by steps 210 and 220 may be used to mask all values of $V_{SET}$ and $V_{RESET}$. Specifically, steps 210 and 220 are performed once to obtain a masking voltage pair, and this masking voltage pair is associated with every value of $\Delta G$. In other words, regardless of the desired value (e.g., according to a training rule) of conductance change $\Delta G$, the masking voltage pair is used. As a result, effectively only the sign information of the desired conductance change $\Delta G$ is used. If the desired conductance change $\Delta G$ is positive, $V_{SET}$ of the masking voltage pair is used, even if $\Delta G!=\Delta G_{SET}$. If the desired conductance change $\Delta G$ is negative, $V_{RESET}$ of the masking voltage pair is used, even if $\Delta G!=\Delta G_{RESET}$. Using such a conductance balanced map would effectively result in a fixed-amplitude control scheme. Alternatively, the conductance balanced map may contain just the masking voltage pair, and no specific masking step is performed. Further alternatively, steps 210 and 220 of FIG. 4 may be repeated several times to obtain a plurality of masking voltage pairs, and each masking voltage pair may be used to mask a sub-range of $V_{SET}$ and $V_{RESET}$.

Figure 7:
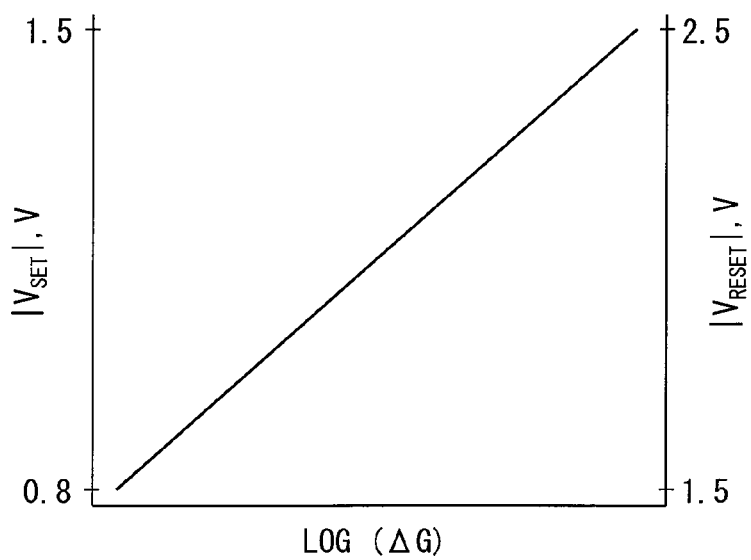
FIG. 7 is a graph showing a conductance balanced map in accordance with the first embodiment.

An exemplary conductance balanced map is shown in graph form in FIG. 7. In this example, curve fitting is performed to determine that for a plurality of conductance balanced voltage pairs, the amplitudes of $V_{SET}$ and $V_{RESET}$ are proportional with, respect to the log of $\Delta G$. Further, in the example of FIG. 7, $V_{SET}$ is illustrated as ranging from a minimum of 0.8V to a maximum of 1.5V, while $V_{RESET}$ is illustrated as ranging from a minimum of 1.5V to a maximum of 2.8V. In this example, the function of Equation (2) above would be in the form of $V=a*\log_e(\Delta G)+b$, where a and b are scaling and offset values, respectively, and different for $V_{SET}$ and $V_{RESET}$. The example of FIG. 7 is illustrative and device-specific, and thus should not be construed as limiting.

Once a conductance balanced map such as that of FIG. 7 is obtained, the neural network 10 may be trained in various manners as known in the field of artificial neural networks. Specifically, the conductance balanced map provides $V_{SET}$ and $V_{RESET}$ values as functions of $\Delta G$, as shown in Equation (2) above. In this case, when the weight (conductance) of a synapse (e.g., the memristive device 113) should be changed in accordance with a training method such as backpropagation, an appropriate $V_{SET}$ or $V_{RESET}$ value may be quickly and directly obtained from the conductance balanced map and applied to the memristive device 113 corresponding to the synapse to be trained. This is because according to Equation (2), the instantaneous conductance G of the memristive device 113 to be trained does not need to be known.

As a result, complex closed-loop or feedback control circuitry is not required to train the neural network 10. Accordingly, the complexity, cost, and computation times of the neural network 10 are reduced. For this reason, the training method of the present embodiment may be efficiently scaled and applied to many-layer memristive neuromorphic neural networks including highly non-linear, recurrent, Deep Neural Networks. Moreover, as the training method of the present embodiment is performed on the hardware memristive devices themselves, such in-situ training ensures that the neural network 10 converges to desirable states while hardware variables and defects are automatically accounted for. Additionally, a memristive neuromorphic circuit implementing the conductance balanced map of the present embodiment enjoys at least these same advantages.

Further, depending on how the conductance balanced map is derived, different types of training may be performed on the neural network 10. For example, if the conductance balanced map is derived by data masking as described above, a fixed-amplitude training process may be performed on the neural network 10. Specifically, instead of obtaining a specific value for $V_{SET}$ or $V_{RESET}$ based on a desired conductance change $\Delta G$, only the sign of the desired conductance change $\Delta G$ is used (i.e., whether the conductance of the memristive device 113 should be increased or decreased). Based on this sign information, a voltage signal of the appropriate sign having a predetermined amplitude is applied to the memristive device 113. In this case, the complexity, cost, and computation times of the neural network 10 are even further reduced.

In addition, the conductance balanced map of the present embodiment provides an accurate method of training the neural network 10 while still maintaining low complexity, cost, and computation times. Specifically, the conductance balanced property of the conductance balanced map of the present embodiment greatly improves the chance of the weights 13 in the neural network 10 converging at desirable values. To illustrate this point, FIGS. 8A, 8B, and 8C show exemplary experimental results that compare the convergence of the neural network 10 when applying a conductance balanced voltage pair versus applying a conductance unbalanced voltage pair during a fixed-amplitude training process.

Figure 8A:
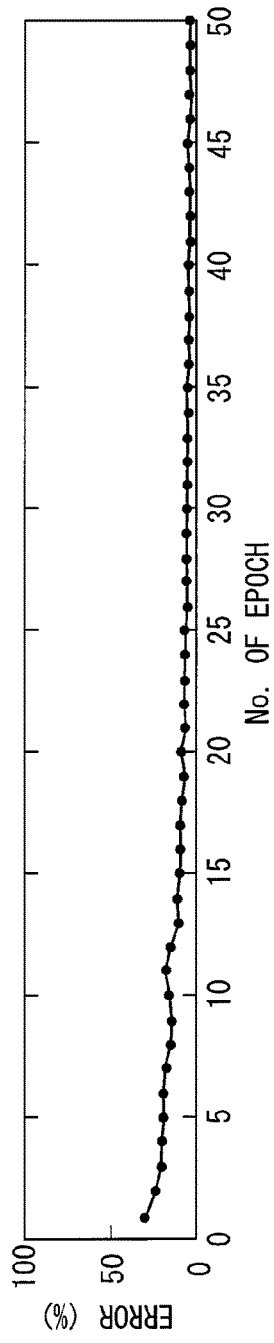
FIGS. 8A, 8B, and 8C are graphs showing training results using the voltage pairs as shown in FIG. 5, FIG. 6A, and FIG. 6B, respectively.
Figure 8B:
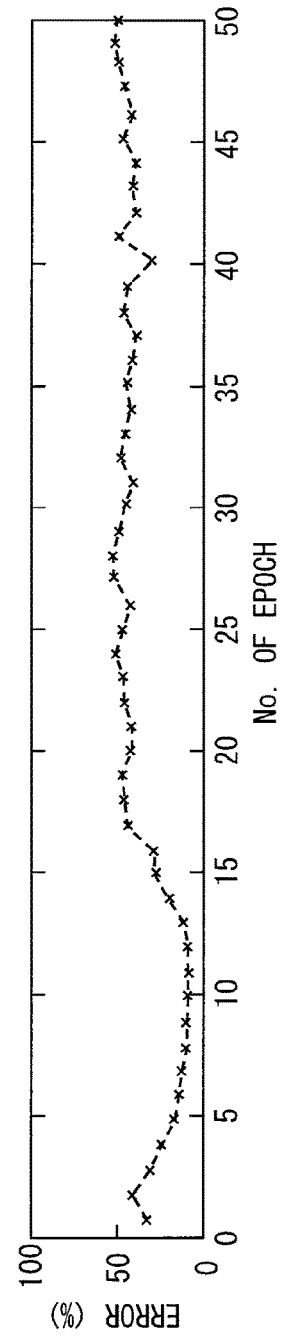
Figure 8C:
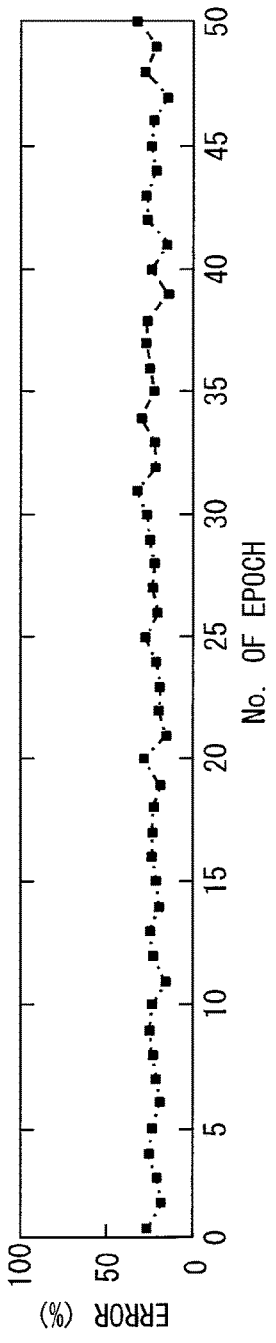

The data shown in FIGS. 8A, 8B, and 8C is generated by in-situ batch training of a multilayer perceptron (MLP) with one hidden layer of three hundred neurons over fifty epochs (i.e., fifty batches). The physical implementation of the MLP is as described above with respect to the present embodiment. The training method used is a fixed-amplitude training process. The MLP is trained on handwritten digit data sets obtained from the Mixed National Institute of Standards and Technology (MNIST) database to ensure that the input data is a standard benchmark so that the results are meaningful.

FIG. 8A depicts training results when using a conductance balanced voltage pair for training. Specifically, a single conductance balanced voltage pair whose characteristics are as shown in FIG. 5 is used. In this case, the weights 13 (conductances) of the neural network 10 steadily converge to desirable values and as a result, the error rate steadily decreases. In this particular experiment, when using the conductance balanced voltage pair for training, the MLP converged to a best error rate of 1.98%, which is highly accurate and comparable to software-implemented neural networks.

In contrast, FIG. 8B depicts training results when using a conductance unbalanced voltage pair where the conductance change curves are disjointed, such as the voltage pair of FIG. 6A. In this case, the conductance change ΔG values of the SET process (the conductance increasing process) dominate those of the RESET process (the conductance decreasing process), and the weights 13 (conductances) of the neural network 10 are strongly biased toward, and therefore collapse to, the maximum conductance value $G_{MAX}$. As a result, error rate of the neural network settles at high values, around 50%.

Further, FIG. 8C depicts training results when using a conductance unbalanced voltage pair where the conductance change curves intersect at specific points, such as the voltage pair of FIG. 6B. In this case, the weights 13 (conductances) of the neural network 10 forcibly and randomly converge at one of the intersection points of the conductance unbalanced voltage pair. As a result, the error rate of the neural network 10 is unpredictable and high, and the neural network does not settle to a desirable state.

Accordingly, a person skill in the art would readily appreciate that even with a limited equilibrium region 250 as shown in FIG. 5, the performance of the neural network 10 is drastically improved over using conductance unbalanced voltage pairs. The experimental results depicted in FIGS. 8A to 8C, as well as the experimental setup used to obtain those results, are illustrative and should not be construed as limiting. For example, while the experimental setup of FIGS. 8A to 8C uses batch training with fixed-amplitude voltage signals, the present disclosure is equally applicable to stochastic training and/or variable-amplitude voltage signals.

Figure 9:
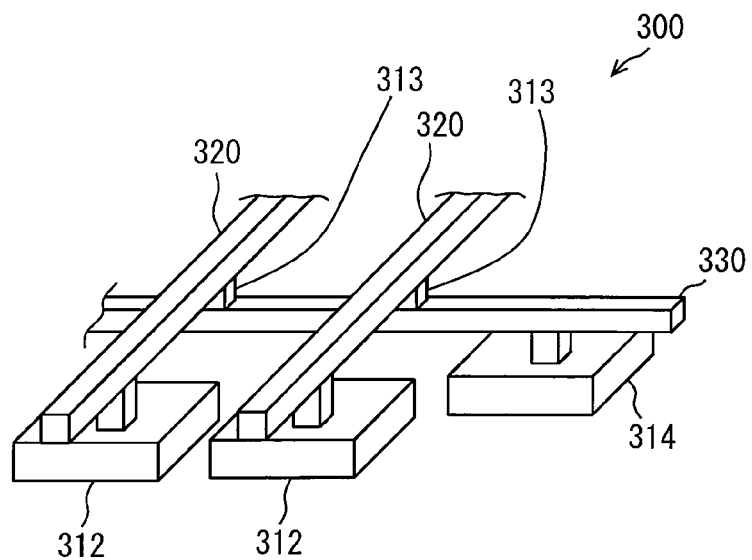
FIG. 9 is a perspective view showing a memristive neuromorphic circuit in accordance with a second embodiment of the present disclosure.
Figure 10:
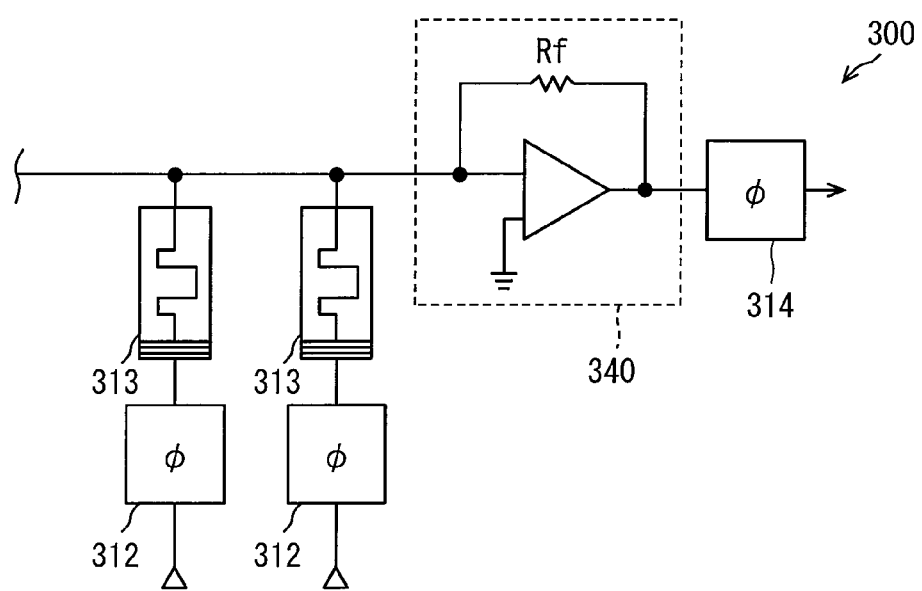
FIG. 10 is a schematic view showing the memristive neuromorphic circuit of the second embodiment.

Next, the neural network 10 of a second embodiment of the present disclosure will be explained with reference to FIGS. 9 and 10. FIG. 9 is a perspective view showing the neural network 10 physically implemented as a hybrid CMOS-memristive crossbar circuit 300, which is a memristive neuromorphic circuit. The crossbar circuit 300 includes a plurality of input neurons 312, a plurality of weights (memristive devices 313), and a plurality of output neurons 314 (one illustrated) as in the first embodiment. Further, in the second embodiment, the individual configurations and properties of the input neurons 312, the output neurons 314, and the memristive devices 313 are preferably the same as those in the first embodiment.

The operations of the crossbar circuit 300 of the second embodiment will be at times explained with reference to a feedforward operation, i.e., where the neural network 10 including the crossbar circuit 300 is used to classify (i.e., read) an input pattern and the input signals propagate in a direction from the input neurons 312 to the output neurons 314. However, the explanations thereof are equally applicable to an error backpropagation operation, i.e., where error signals are backpropagated through the neural network 10 in a direction from the output neurons 314 to the input neurons 312. Moreover, the configurations of the second embodiment are compatible with, and may be applied to, the first embodiment, and vice versa.

In FIG. 9, an input voltage is propagated through the crossbar circuit 300 by traversing through the input neurons 312, an input crossbar nanowire 320, the memristive devices 313, an output crossbar nanowire 330, and then the output neurons 314, in this order. Consistent with the schematic view of FIG. 1, here FIG. 9 also shows that multiple input neurons 312 are connected to each output neuron 314 through respective memristive devices 313. To be clear, the crossbar nanowires 320, 330 of FIG. 9 do not constitute specific elements in the neural network 10, and merely act as volume-efficient, high-density conductors to cross-connect the input neurons 312 with the output neurons 314 through the memristive devices 313. In this case, the crossbar configuration of FIG. 9 enables production of a reliable, high-density neural network 10 that includes a large number of neurons in a small physical package.

During feedforward of input patterns (i.e., reading), in order to sum the plurality of voltage signals being sent to each output neuron 314, summing circuitry is included in the crossbar circuit 300. In the present embodiment, the summing circuitry is preferably a summing op-amp circuit 340 in advance of each output neuron 314, but may alternatively be integrated together with the IC of each neuron. FIG. 10 is a schematic view of the crossbar circuit 300 showing a summing op-amp circuit 340 in accordance with the present embodiment. In FIG. 10, input voltage signals (which as used here refers to outputs from corresponding input neurons 312) are transmitted through respective memristive devices 313 and summed by the summing op-amp circuit 340. The summing op-amp circuit 340 may be configured as a typical negative feedback summing amplifier having a feedback resistor value $R_f$. In this case, the output of the summing op-amp circuit 340 is the sum of dot multiplications of each voltage signal with its corresponding memristive device 313. This relationship may be given as:

$$|V_{out}| = R_f * \Sigma G_i * V_i \quad (3)$$

where $V_{out}$ is the output of the summing op-amp circuit 340, and $V_i$, $G_i$ are the voltage signal and instantaneous conductance from each input neuron 312 and memristive device 313 pair. Further, in order to accommodate backpropagation of error through the crossbar circuit 300, summing circuitry is preferably provided for each input neuron 312 in a similar manner.

As shown in Equation (3), while the instantaneous conductance G of the memristive device 313 scales each individual input voltage signal, the feedback resistor $R_f$ of the summing op-amp circuit 340 further scales the entire sum of all inputs to each output neuron 314. From the point of view of the output neurons 314, however, there is little difference whether the input voltages are being scaled by the memristive device 313 or by the summing op-amp circuit 340. Specifically, the memristive device 313 has an effective range of conductances from $G_{MIN}$ to $G_{MAX}$ as previously noted. When the summing op-amp circuit 340 scales the voltage signal received from the memristive device 313, this effective range of conductances of the memristive device 313, from the point of view of the output neurons 314, is also scaled.

Here, the conductance balanced map as discussed in the first embodiment may be used to train the crossbar circuit 300 in the second embodiment. At the same time, the feedback resistor value $R_f$ of the summing op-amp circuit 340 may be adjusted to scale the sum of all voltage inputs to each output neuron 314. As a result, from the point of view of the output neurons 314, the equilibrium region 250 of the conductance balanced voltage pair being applied is effectively scaled in width as well. As a result, the range of values at which the weights 13 in the neural network 10 may settle at is increased, and the overall performance of the neural network 10 is improved. In the present embodiment, the feedback resistor value $R_f$ is consistent across all summing op-amp circuits 340 in the neural network 10. However, other configurations are also contemplated. For example, in a multilayer neural network 10, the feedback resistor value $R_f$ may be set to different values for each layer. Alternatively, the feedback resistor value $R_f$ may be randomized throughout the neural network 10.

Figure 11:
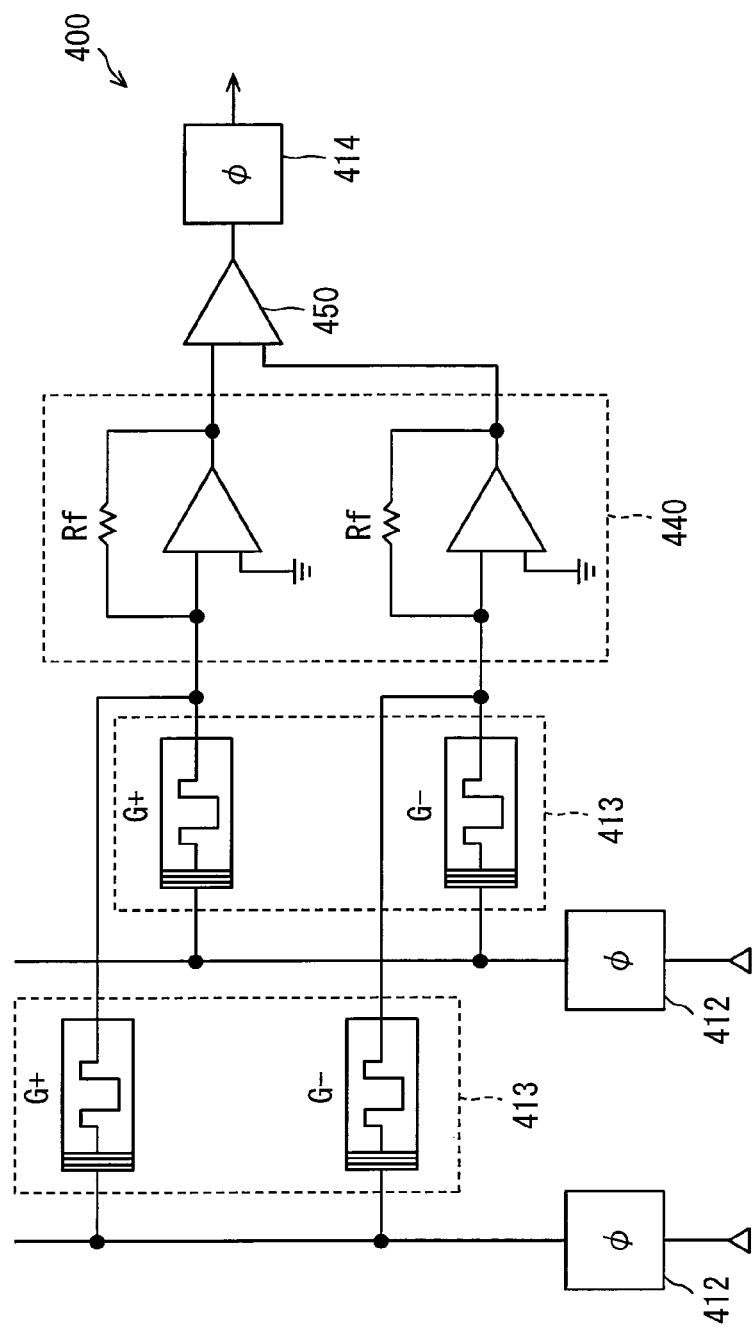
FIG. 11 is a schematic view showing a memristive neuromorphic circuit in accordance with a third embodiment of the present disclosure.

Next, the neural network 10 of a third embodiment of the present disclosure will be explained with reference to FIG. 11. In the third embodiment, the weights 13 of the neural network 10 are implemented in differential pairs. FIG. 11 is a schematic view showing the neural network 10 physically implemented as a differential pair memristive neuromorphic circuit 400 using differential pairs of memristive devices 413. The memristive neuromorphic circuit 400 includes a plurality of input neurons 412, a plurality of weights (differential pairs 413), and a plurality of output neurons 414 (one illustrated) as in the first embodiment. Further, in the third embodiment, the individual configurations and properties of the input neurons 412, the output neurons 414, and the differential pairs of memristive devices 413 are preferably the same as those in the first embodiment. Further, the memristive neuromorphic circuit 400 of the third embodiment is preferably arranged as a crossbar circuit.

In FIG. 11, the input voltage signals (which as used here refers to outputs from corresponding input neurons 412) are transmitted through respective differential pairs of memristive devices 413. Each differential pair of memristive devices 413 includes a memristive device with an instantaneous conductance of $G^+$ and a memristive device with an instantaneous conductance of $G^-$. It should be noted that both $G^+$ and $G^-$ are, in practice, positive values, and the sign notations are for labeling purposes as will become apparent in the following explanation.

The differential pairs of memristive devices 413 are connected to summing op-amp circuits 440, which may be configured in the same manner as in the second embodiment. In the present embodiment, preferably two summing op-amp circuits 440 are provided for each output neuron 414, with one summing op-amp circuit for summing all voltage signals passing through $G^+$ conductances, and another summing op-amp circuit for summing all voltage signals passing through $G^-$ conductances, as shown in FIG. 11. The pair of summing op-amp circuits 440 are then connected to a unity gain differential amplifier 450, whose configuration is preferably typical (e.g., an op-amp with unity gain feedback resistors) and therefore details thereof are omitted for brevity. The output of the differential amplifier 450 is connected to the output neuron 414, and may be given as:

$$V_{DIFF} = (R_f * \Sigma G_i^+ * V_i) - (R_f * \Sigma G_i^- * V_i) \qquad (4)$$

As shown, Equation (4) represents the difference between two values of $|V_{out}|$ from Equation (3). This is reflected in FIG. 11, which may be considered as the schematic equivalent of calculating, by the differential amplifier 450, the difference between two sets of the crossbar circuit 300 shown in FIG. 10. Here, by individually adjusting the instantaneous conductances $G^+$ and $G^-$ for each input voltage signal, the overall instantaneous conductance G of each differential pair of memristive devices 413 may be a positive value (i.e., the differential amplifier 450 outputs a positive voltage) or a negative value (i.e., the differential amplifier 450 outputs a negative voltage). In other words, a given differential pair of memristive devices 413 may represent an overall conductance ranging from $-(G_{MAX}-G_{MIN})$ to $(G_{MAX}-G_{MIN})$, where $G_{MIN}$ and $G_{MAX}$ are the minimum and maximum instantaneous conductance values of either memristive device in each differential pair 413. As a result, the weights 13 of the neural network 10 may converge at both positive and negative weight values, and the flexibility and performance of the overall neural network 10 is improved.

Further, in the present embodiment, the feedback resistor value $R_f$ is present in Equation (4) as shown above. Accordingly, in a similar manner as the second embodiment $R_f$ may be adjusted so that the summing op-amp circuits 440 scale the output of the differential pairs of memristive devices 413, in order to extend the equilibrium region 250 of the conductance balanced map during training of the neural network 10. However, the present embodiment enjoys further advantages in that the differential pairs of memristive devices 413 model an overall conductance ranging from $-(G_{MAX}-G_{MIN})$ to $(G_{MAX}-G_{MIN})$, and thus any scaling performed by the summing op-amp circuits 440 will scale the overall conductance of the differential pairs of memristive devices 413 about zero. As a result, the range of values at which the weights 13 in the neural network 10 may settle at is increased, and the overall performance of the neural network 10 is improved. In the present embodiment, the feedback resistor value $R_f$ is consistent across all summing op-amp circuits 440 in the neural network 10. However, other configurations are also contemplated. For example, in a multilayer neural network 10, the feedback resistor value $R_f$ may be set to different values for each layer. Alternatively, the feedback resistor value $R_f$ may be randomized throughout the neural network 10.

In a further aspect of the present embodiment, a plurality of differential pairs of memristive devices 413 are connected to each input neuron 412 in order to extend the equilibrium region 250 of the conductance balanced map. Specifically, by using a plurality of differential pairs of memristive devices 413 for each input neuron 412, the overall conductance range for each weight 13 of the neural network 10 is increased to $-N*(G_{MAX}-G_{MIN})$ to $N*(G_{MAX}-G_{MIN})$, where N is the number of differential pairs 413 used. As a result, when using the conductance balanced map of the first embodiment to train the neural network 10 of the present embodiment, the equilibrium regions 250 of each memristive device in the plurality of differential pairs 413 are effectively summed together, thereby increasing the overall equilibrium region 250.

The circuit layout shown in FIG. 11 is representative and should be not construed as limiting. A number of alternative configurations that provide equivalent, or substantially equivalent, function are contemplated. For example, in FIG. 11, the feedforward input voltages are sent through the differential amplifier 450 after passing through the differential pairs 413. However, equally applicable to the present disclosure is the reverse, i.e., where the feedforward input voltages are split into complimentary signals by an inverting gate, and then sent through respective G+ and G− memristive devices. In this case the signs of the voltage signals passing through the G+ and G− memristive devices are opposite from each other, and therefore may be simply summed together after passing through the differential pairs 413.

A fourth embodiment of the present disclosure will be explained with reference to FIG. 12. Specifically, the present embodiment provides a method of initializing the instantaneous conductance G of memristive devices in, e.g., the neural network 10 described with respect to the first, second, or third embodiment.

Figure 12:
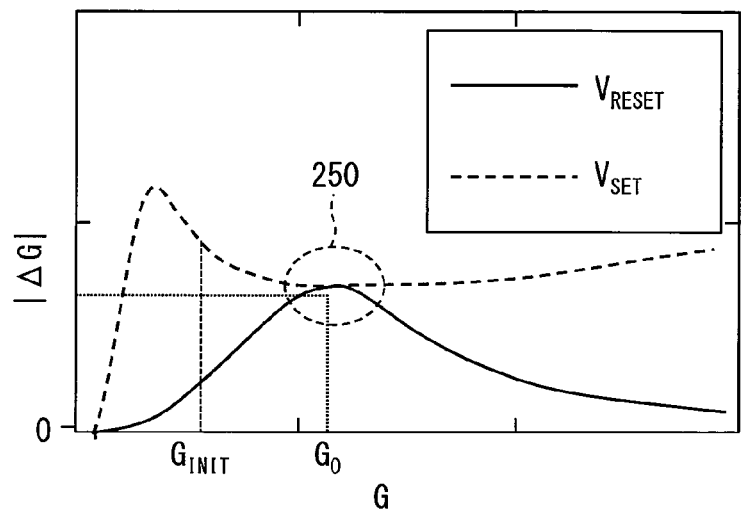
FIG. 12 is a graph showing an initializing conductance in accordance with a fourth embodiment of the present disclosure.

FIG. 12 shows conductance change curves for an exemplary conductance balanced voltage pair having the equilibrium region 250 centered about a nominal conductance $G_0$. In the present embodiment, the memristive devices of the neural network 10 are initialized with an instantaneous conductance $G_{INIT}$ that is less than $G_0$. In particular, $G_{INIT}$ is preferably positioned on a downward slope area of the $V_{SET}$ conductance change curve, as shown in FIG. 12. As a result, during training of the neural network 10, the $V_{SET}$ conductance change curve initially dominates that of $V_{RESET}$ (i.e., $\Delta G_{SET} > \Delta G_{RESET}$). Recall that the SET process increases conductance, while the RESET process decreases conductance. Accordingly, the dominant $V_{SET}$ conductance change curve strongly biases the weights 13 (i.e., conductances) of the neural network 10 to increase toward $G_0$, and thus toward the equilibrium region 250. Once the weights 13 are in the equilibrium region 250, the neural network 10 is free to then converge toward low-error states.

In contrast, if, for example, the memristive devices of the neural network 10 were initialized with an instantaneous conductance $G_{INIT}$ that is greater than $G_0$, in the exemplary configuration of FIG. 12, the $V_{SET}$ conductance change curve will still initially dominate that of $V_{RESET}$, and bias the weights 13 of the neural network 10 toward collapsing to $G_{MAX}$ instead.

The specific conductance change curves illustrated in FIG. 12 are exemplary in nature. For example, in another case the weights 13 in the neural network 10 may have conductance change curves where $\Delta G_{SET}$ is less than $\Delta G_{RESET}$ in the range where $G > G_0$. In this case, the weights 13 may be initialized with a $G_{INIT}$ that is greater than $G_0$ and still be biased toward the equilibrium region 250. In other words, the initialization process of the present embodiment may be adapted to conductance balanced voltage pairs having any conductance change curve shapes, so long as $G_{INIT}$ is chosen such that the dominant process (i.e., one of $V_{SET}$ and $V_{RESET}$) initially biases the weights 13 of the neural network 10 toward the equilibrium region 250.

Moreover, in the present embodiment, the memristive devices of the neural network 10 are not necessarily all initialized with the same $G_{INIT}$ value. Instead, the memristive devices may be initialized with randomized conductances centered around $G_{INIT}$. For example, in one aspect of the present embodiment, the memristive devices are initialized with conductances normally distributed about $G_{INIT}$ with a predetermined standard deviation.

Further, the initialization process of the present embodiment may be applied to the neural network 10 in a variety of manners. In one aspect of the present embodiment, feedback tuning is used to perform closed-loop control on the memristive devices of the neural network 10 to initialize the conductances. Closed-loop control allows the memristive devices to be initialized with accurate mean and standard deviation values, but requires additional circuitry. In another aspect of the present embodiment, the memristive devices are RESET until reaching the minimum conductance $G_{MIN}$, and then SET with a predetermined $V_{SET}$ voltage signal to approximately reach $G_{INIT}$. These aspects are merely preferred, and are not to be construed as limiting in the present embodiment.

Figure 13:
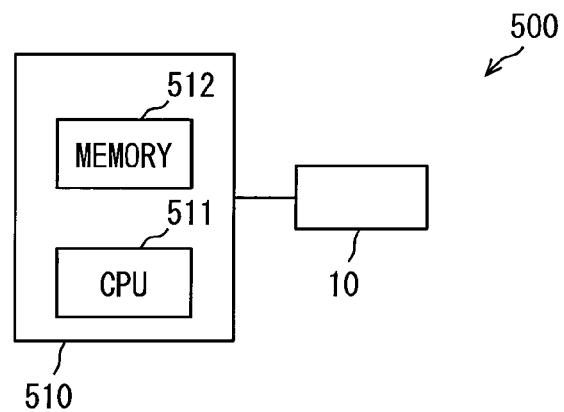
FIG. 13 is a schematic view showing a control system in accordance with the present disclosure.

The above embodiments of the present disclosure may be implemented as a control system 500. FIG. 13 is a schematic view showing the control system 500 including a controller 510 that has a CPU (or processor) 511 and a memory 512. The controller 510 is in bi-directional communication with the neural network 10. The CPU 511 of the controller 510 reads programs and data stored on the memory 512 to operate the controller 510. Here, the neural network 10 may be in accordance with any of the above embodiments. The controller 510 preferably includes drive circuitry and sensing circuitry (not illustrated) to read and write the neural network 10.

Specifically, the controller 510 is configured to read the neural network 10 by applying input signals thereto during feedforward of input patterns and by applying an error signal thereto during backpropagation of error. Additionally, based on a training rule, such as backpropagation, the controller 510 is configured to write to the memristive devices of the neural network 10 by preferably using the conductance balanced map (i.e., by applying conductance balanced voltage pairs of $V_{SET}$ and $V_{RESET}$). Accordingly, the control system 500 may implement any of the embodiments discussed previously.

In addition, the layout of the control system 600 shown in FIG. 12 is exemplary and thus should not be construed as limiting. A number of alternative configurations are contemplated and are applicable to the present disclosure. In one alternative embodiment, the control system 600 is implemented as an integrated neuromorphic system where memristive devices form both the neuromorphic core (i.e., providing the analog weights 13 in the neural network 10) and the CPU core (i.e., providing digital memory). In this case, a separate CMOS memory such as SRAM or embedded flash is not required, and the control system 600 may be manufactured through fewer processes to save costs.

The present disclosure is not limited to the above embodiments, and a variety of modifications which do not depart from the gist of the present disclosure are contemplated.

In one modified aspect of the above embodiments, the conductance balanced voltage pairs of the conductance balanced map do not effect a substantially same magnitude conductance change $\Delta G$ in the memristive devices. Instead, in step 220 of FIG. 4, the durations $\Delta t$ of $V_{SET}$ and $V_{RESET}$ may be adjusted so that $\Delta G_{SET} = k^* \Delta G_{RESET}$, where k is an arbitrary ratio. In other words, the present modified aspect is not necessary predicated on the conductance balanced voltage pairs effecting a substantially same conductance change. Rather, as long as a known relationship between $\Delta G_{SET}$ and $\Delta G_{RESET}$ is defined, a desired imbalance (i.e., the above ratio k) may be used and conductance balanced training of the neural network 10 may still be carried out.

In another modified aspect of the above embodiments, the conductance balanced map is derived without maintaining a duration Δt ratio between $V_{SET}$ and $V_{RESET}$. Specifically, the selection and balancing steps 210 and 220 of FIG. 4 are repeated such that a respective duration Δt ratio is set for each conductance balanced voltage pair to maximize the equilibrium region 250 of each voltage pair. Accordingly, the conductance balanced map may take into account the rate of change in conductance ΔG/Δt over the duration Δt an applied $V_{SET}$ or $V_{RESET}$ voltage signal. As a result, a more accurate conductance balanced map may be provided.

In yet another modified aspect of the above embodiments, in step 220 of FIG. 4, the amplitudes, not the durations Δt, of the selected voltage pair $V_{SET}$ and $V_{RESET}$ are individually adjusted such that $V_{SET}$ and $V_{RESET}$ are conductance balanced over a range of instantaneous conductance G of the memristive devices. Specifically, only the amplitude of the selected $V_{SET}$ may be adjusted, or only the amplitude of the selected $V_{RESET}$ may be adjusted, or both may be adjusted. Alternatively, both the amplitudes and the durations Δt of the selected voltage pair $V_{SET}$ and $V_{RESET}$ may be individually adjusted. As a result, the equilibrium region 250 may be modified to include desirable conductance values.

In yet another modified aspect of the above embodiments, the various components of the neural network 10, including the input neurons 12, the output neurons 14, any crossbar nanowires, and the weights (memristive devices) 13, may be integrally formed in a single IC. As a result, the physical package size of the neural network 10 may be reduced, and the neural network 10 may be less susceptible to environmental effects such as changes in temperature. Alternatively, the input neurons 12 and the output neurons 14 of the neural network 10 may be integrally formed as a neuron circuit.

In yet another modified aspect of the above embodiments, the activation functions φ of the input neurons and the output neurons may be implemented as separate CMOS devices. For example, a dedicated activation function IC may be provided at appropriate locations to transform voltage signals in the neural network 10.

The above described embodiments and modifications may also be combined in various manners even if such a combination is not specifically mentioned, given that such a combination does not depart from the gist of the present disclosure. Accordingly, the scope of the embodiments should not be limited to the discussion above, but should rather include a wide range of equivalents, modifications, and combinations.

The invention claimed is:

1. A method for training a memristive neuromorphic circuit, the method comprising:
providing a conductance balanced voltage pair that includes a set voltage and a reset voltage, wherein either one of the set voltage and the reset voltage, when applied to a memristive device that is connected to a neuron circuit, effects a substantially same magnitude conductance change in the memristive device over a predetermined range of conductance of the memristive device;
storing the provided voltage pair as a conductance balanced map; and
applying, based on the conductance balanced map, a training voltage to the memristive device.

2. The method of claim 1, wherein
the step of providing includes
selecting the set voltage and the reset voltage, and
identifying an equilibrium region as the predetermined range of conductance of the memristive device by adjusting at least one of a duration of the set voltage, a duration of the reset voltage, an amplitude of the set voltage, and an amplitude of the reset voltage.

3. The method of claim 1, further comprising:
based on the provided voltage pair, deriving a plurality of conductance balanced voltage pairs that effect different magnitude conductance changes from the provided voltage pair; and
storing the provided voltage pair and the plurality of derived voltage pairs as the conductance balanced map.

4. The method of claim 3, wherein
the step of deriving includes extrapolating the plurality of derived voltage pairs from the provided voltage pair.

5. The method of claim 3, wherein
the provided voltage pair includes a first conductance balanced voltage pair,
the step of providing includes providing a second conductance balanced voltage pair, and
the step of deriving includes interpolating the plurality of derived voltage pairs from the first voltage pair and the second voltage pair.

6. The method of claim 1, wherein
the step of providing includes providing a plurality of conductance balanced voltage pairs, and
the step of storing includes storing the plurality of conductance balanced voltage pairs as the conductance balanced map.

7. The method of claim 1, wherein
the provided voltage pair includes a masking voltage pair, and
the step of storing includes associating the masking voltage pair with an entire range of conductance of the memristive device.

8. The method of claim 1, wherein
the conductance balanced maps stores the provided voltage pair in the form of:

$$V=f(\Delta G)$$

for both the set voltage and the reset voltage, where V is one of the set voltage and the reset voltage, ΔG is the substantially same magnitude conductance change effected by the set voltage and the reset voltage, and f( ) is an arbitrary function.

9. The method of claim 1, further comprising:
initializing the memristive device with an initial conductance such that when the training voltage is applied to the memristive device, the conductance of the memristive device is biased toward the predetermined range of conductance.

10. A memristive neuromorphic circuit, comprising:
a neuron circuit;
a memristive device that is connected to the neuron circuit; and
a controller including a processor and a memory, wherein
the memory is configured to store a conductance balanced map; and
the controller is configured to apply, based on the conductance balanced map, a training voltage to the memristive device, wherein
the conductance balanced map includes a conductance balanced voltage pair of a set voltage and a reset voltage, wherein either one of the set voltage and the reset voltage, when applied to the memristive device, effects a substantially same magnitude conductance change in the memristive device over a predetermined range of conductance of the memristive device.

11. The memristive neuromorphic circuit of claim 10, further comprising:
a summing op-amp circuit connecting the neuron circuit to the memristive circuit, wherein
the summing op-amp circuit includes an adjustable feedback resistor value that scales a voltage signal transmitted from the neuron circuit to the memristive circuit.

12. The memristive neuromorphic circuit of claim 10, wherein
the memristive device is a first memristive device of a differential pair of memristive devices connected to the neuron circuit, the differential pair of memristive devices including the first memristive device and a second memristive device.

13. The memristive neuromorphic circuit of claim 12, further comprising:
a differential amplifier connected to the differential pair of memristive devices, the differential amplifier configured to calculate a difference between an output of the first memristive device and an output of the second memristive device.

14. The memristive neuromorphic circuit of claim 12, wherein
the differential pair of memristive devices is a first differential pair of a plurality of differential pairs of memristive devices, and
the plurality of differential pairs of memristive devices are connected to the neuron circuit.

15. The memristive neuromorphic circuit of claim 10, further including:
a plurality of crossbar nanowires, wherein
the neuron circuit, the memristive device, and the plurality of crossbar nanowires are connected together as a crossbar circuit.

16. The memristive neuromorphic circuit of claim 10, wherein
the neuron circuit includes at least one of an input neuron and an output neuron.

17. The memristive neuromorphic circuit of claim 16, wherein
the memristive device is connected between the input neuron and the output neuron.

18. The memristive neuromorphic circuit of claim 17, further comprising:

a first summing op-amp circuit connected between the memristive device and the input neuron; and
a second summing op-amp circuit connected between the memristive device and the output neuron.

19. The memristive neuromorphic circuit of claim 18, wherein
the input neuron, the first summing op-amp circuit, the memristive device, the second summing op-amp circuit, and the output neuron are integrally formed as a single integrated circuit.

20. A method for training a memristive neuromorphic circuit, the method comprising:
providing a first conductance balanced voltage pair that includes a first set voltage and a first reset voltage, wherein
the first set voltage, when applied to a memristive device that is connected to a neuron circuit, effects a first magnitude conductance change in the memristive device over a predetermined range of conductance of the memristive device, and
the first reset voltage, when applied to the memristive device, effects a second magnitude conductance change in the memristive device over the predetermined range of conductance of the memristive device;
providing a second conductance balanced voltage pair that includes a second set voltage and a second reset voltage, wherein
the second set voltage, when applied to the memristive device, effects a third magnitude conductance change in the memristive device over the predetermined range of conductance of the memristive device, and
the second reset voltage, when applied to the memristive device, effects a fourth magnitude conductance change in the memristive device over the predetermined range of conductance of the memristive device;
storing the provided first and second voltage pairs as a conductance balanced map; and
applying, based on the conductance balanced map, a training voltage to the memristive device, wherein
a ratio between the first magnitude and the second magnitude is substantially equal to a ratio between the third magnitude and the fourth magnitude.

* * * * *